United States Patent

[11] 3,577,589

[72] Inventors: Mario Serrano; William D. Wolf, Simsbury, Conn.
[21] Appl. No.: 827,081
[22] Filed: Mar. 12, 1969
Division of Ser. No. 705,443 Feb. 14, 1968, abandoned
[45] Patented: May 4, 1971
[73] Assignee: Monsanto Company St. Louis, Mo.

[54] APPARATUS FOR INCREASING THE DENSITY OF THERMOPLASTIC FOAM
4 Claims, 12 Drawing Figs.

[52] U.S. Cl. .................................................. 18/125M, 18/30AF, 146/165
[51] Int. Cl. .................................................. B29f 3/02
[50] Field of Search ......................................... 18/30 (AF,SN), 12 (SF,SH,ST,SV), 30 (Y), 1 (A); 264/321, 163, 68, 117, 80, 140, 118; 241/246, 247, 167; 146/165, 71.5

[56] References Cited
UNITED STATES PATENTS
| | | | |
|---|---|---|---|
| 274,209 | 3/1883 | McCully | 241/246 |
| 1,961,862 | 6/1934 | Park | 241/246X |
| 2,129,789 | 9/1938 | Seaborne | 241/246X |
| 3,009,685 | 11/1961 | Rettig | 18/12X |
| 3,256,568 | 6/1966 | Stenger | 18/30 |
| 3,346,917 | 10/1967 | Lennox | 18/12 |

FOREIGN PATENTS
| | | | |
|---|---|---|---|
| 501,028 | 2/1951 | Belgium | 241/246 |
| 1,007,862 | 1962 | Japan | 18/30(AF) |

Primary Examiner—J. Spencer Overholser
Assistant Examiner—Michael O. Sutton
Attorneys—Michael J. Murphy, James C. Logomasini and Herbert B. Roberts ABSTRACT: A method and apparatus for densifying thermoplastic foam wherein the foam cells are crushed by mulling within a narrow chamber formed by plates or members mounted for relative rotation with respect to each other. The densified foam emerges as a high density curdlike extrudate at the periphery of the members.

PATENTED MAY 4 1971
3,577,589
SHEET 1 OF 4
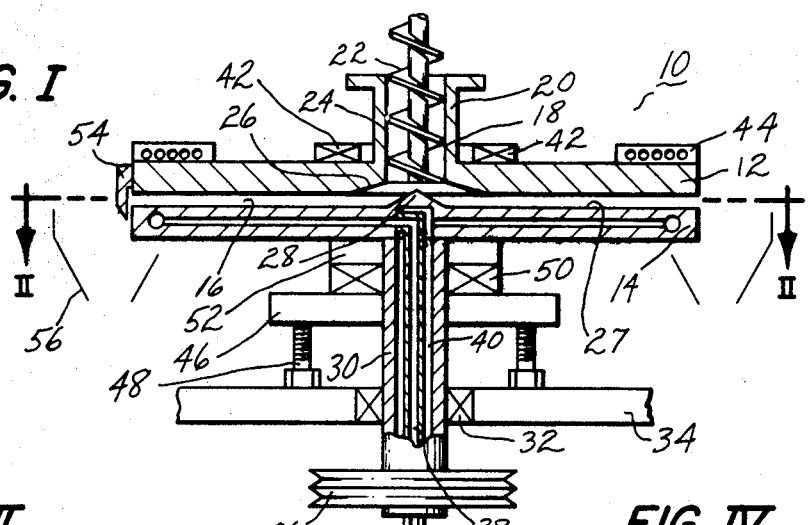
FIG. I
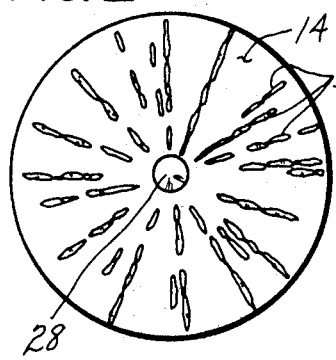
FIG. II
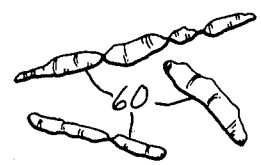
FIG. III
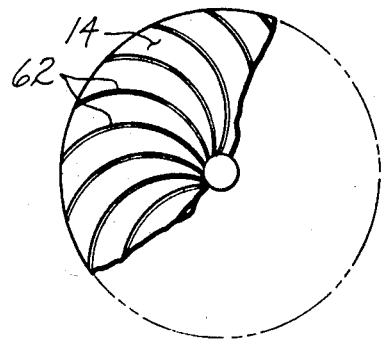
FIG. IV
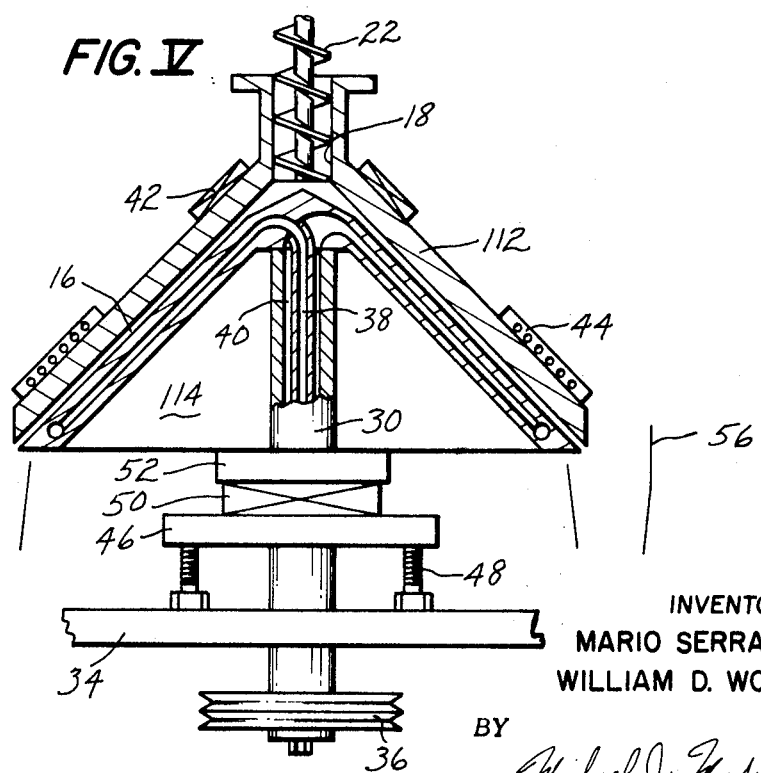
FIG. V
INVENTORS
MARIO SERRANO
WILLIAM D. WOLF
BY
Michael J. Murphy
ATTORNEY FIG. VI
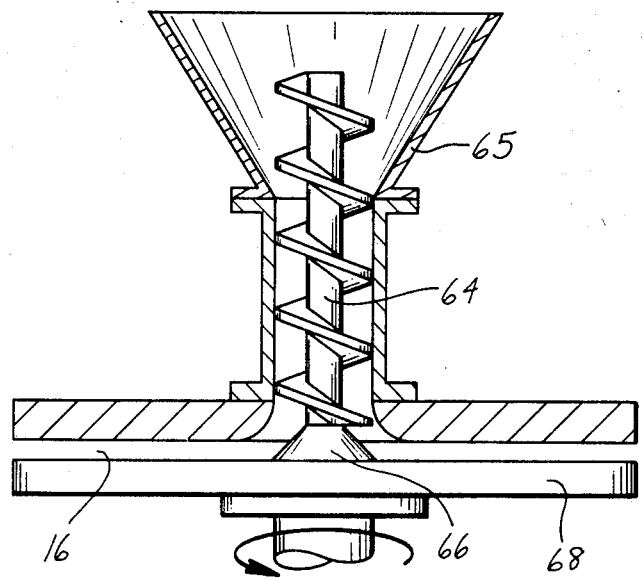
FIG. VII
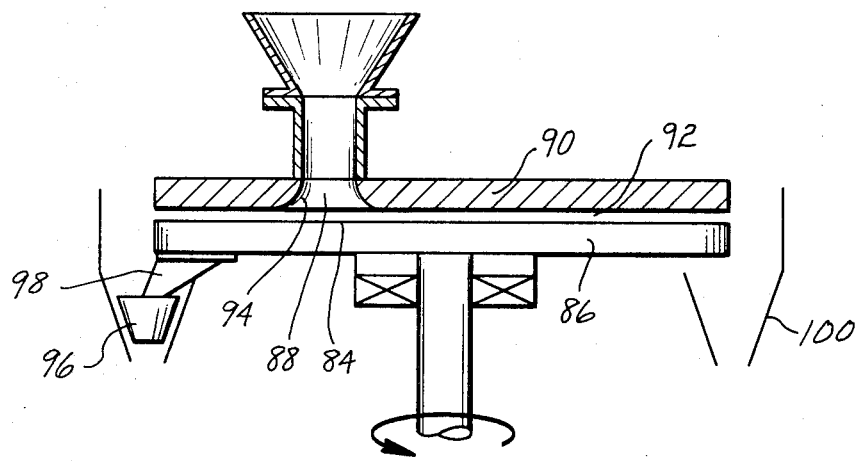
INVENTORS
MARIO SERRANO
WILLIAM D. WOLF
BY
*Michael J. Murphy*
ATTORNEY:

FIG. VIII
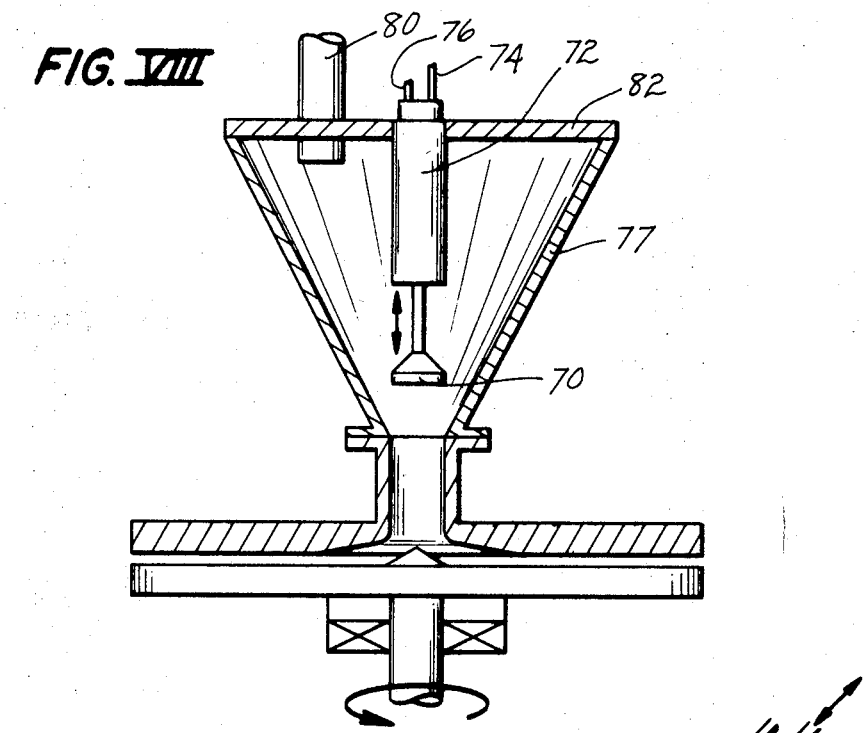
FIG. IX
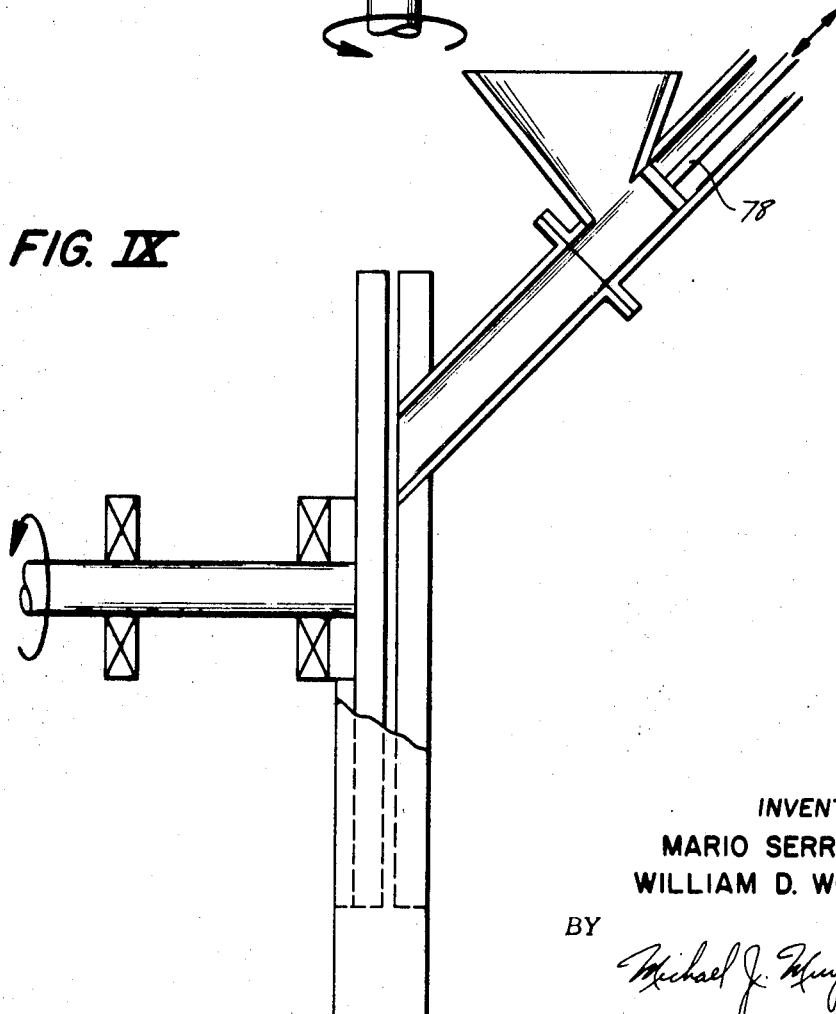
INVENTORS
MARIO SERRANO
WILLIAM D. WOLF
BY
*Michael J. Murphy*
ATTORNEY:

PATENTED MAY 4 1971
3,577,589
SHEET 4 OF 4
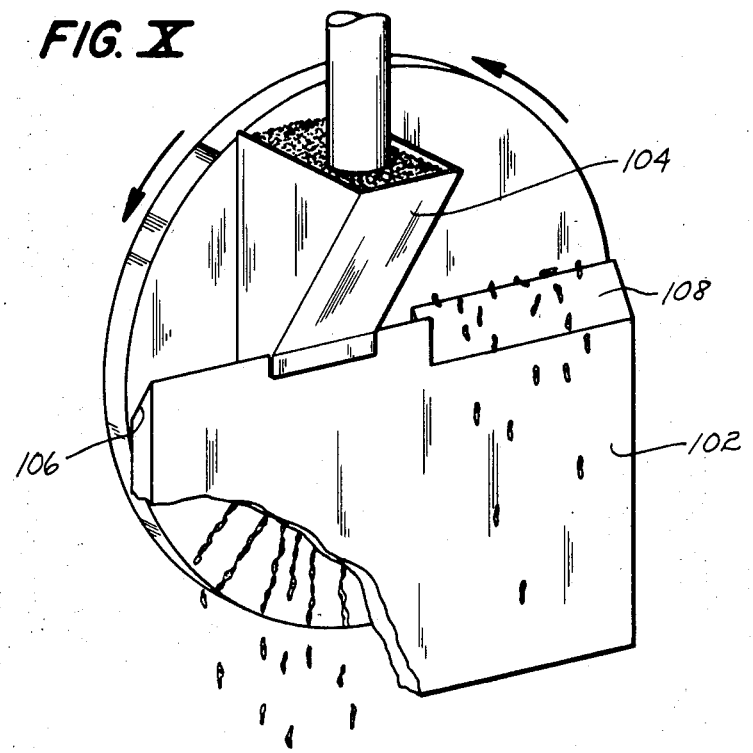
FIG. X
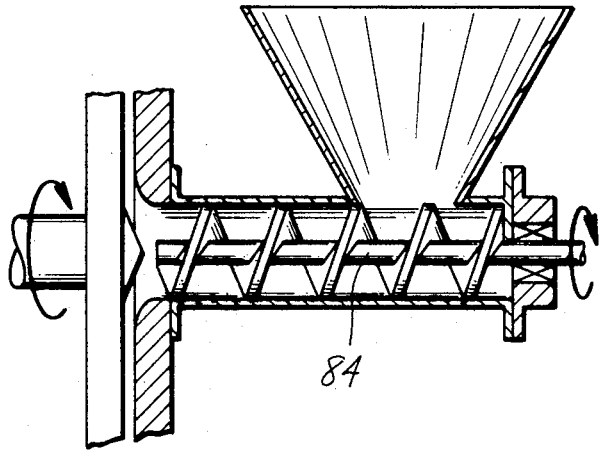
FIG. XI
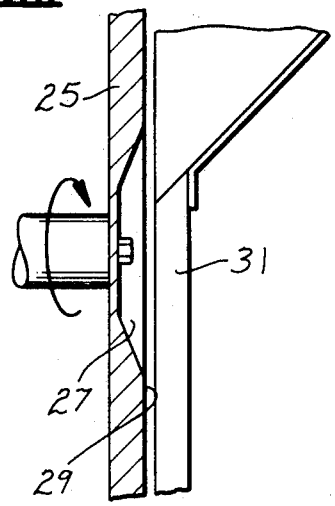
FIG. XII
INVENTORS
MARIO SERRANO
WILLIAM D. WOLF
BY
  *Michael J. Murphy*
ATTORNEY 3,577,589

APPARATUS FOR INCREASING THE DENSITY OF THERMOPLASTIC FOAM

This is a division of copending application Ser. No. 705,443 filed Feb. 14, 1968, now abandoned.

BACKGROUND

This invention relates to a novel apparatus for densifying thermoplastic foam scrap.

Thermoplastic resins such as polystyrene, polyethylene, polyvinyl chloride, etc. having a foaming agent incorporated therein, may be extruded into a foamed sheet, and then formed into useful shapes by known thermoforming techniques such as vacuum, pressure, or drape forming or combinations thereof. As a by product of such forming processes, there is a great amount of scrap generated which cannot be recycled to form additional foam sheet until it has been further processed to increase its density, to a level approximating that of the original resin in the nonfoamed state. This is necessary because the high bulk of the low density foam material significantly decreases the capacity of a downstream foam extruder, which is based on its volumetric throughput rate. If the rotational speed of the extruder screw is increased to compensate for the lower density material, the frictional work heat added to the material is increased and an extruder cooling problem arises.

Scrap of a similar nature is also generated by other foam forming processes such as in molding foamable beads by the well-known steam chamber technique or by equivalent methods. Scrap of the type to which the present invention applies may also be generated in processes where the finished foamed product is directly formed, e.g. by extrusion of foam directly into the useful article such as a log or blocklike product. Similarly the present invention is applicable to the reprocessing of off grade or damaged finished foam products. The invention may likewise be used to densify used foamed articles such as vending cups and the like, which present a waste disposal problem in their high bulk state.

"Scrap" as herein used is meant to include thermoplastic foam materials having a density substantially less than that of the nonfoamed resin, which it is desired to increase by reprocessing.

One method presently in use for conditioning foam scrap involves chopping the scrap into a relatively finely divided flake form and then stuffing the high bulk, low density flakes into a standard vented extruder, whereupon through heat and substantial pressure generated within the extruder the scrap is melted and extruded in the form of a plurality of rods, which are then pelletized and later fed to foam forming equipment as a raw material resin. In so doing however, the time is increased during which the resin is exposed to elevated temperatures, which is commonly referred to as its heat history. For most resins it is desirable to keep the heat history as low as possible, since if it exceeds a certain level substantial decomposition may occur and the quality of the finished product may be affected. Furthermore, this method is obviously expensive, and affects the economics of the overall foaming process due to the high cost of manpower and of the scrap processing equipment (i.e. the extruder built to withstand substantial pressure, cutter and auxiliary handling equipment). The extensive use of valuable processing floor space which is not involved in the actual production of the finished product is also disadvantageous.

SUMMARY OF THE INVENTION

It is therefore an object of the present invention to overcome the above elicited shortcomings of the various prior art methods of reprocessing foam scrap.

It is another object of the present invention to provide an apparatus and method for recovering foam scrap wherein the processing time is minimized so that the recovered material is provided with virtually no additional heat history, thus minimizing the head degradation caused by the more severe high heat, high shear, high-pressure recovery methods of the prior art.

It is a further object of the present invention to provide a novel apparatus and method whereby the density of thermoplastic foam scrap may be increased to a reprocessable level in a reduced time and at a minimum cost.

It is a still further object of the present invention to provide a novel foam scrap densifying apparatus which is of simple, low cost construction, is uncomplicated in its manner of operation and its need for adjustment and/or repair, and which lends itself to economical vertical orientation so as to conserve valuable plant floor space.

A still further object of the present invention is to provide novel densified curds which were formed by the novel apparatus and process of the present invention, and which are in a highly useful and convenient form for reprocessing as a feed material for foamed resin extrusion.

A further object of this invention is to provide a novel method of blending ingredients used in a foam forming process.

These and other objects and advantages of the present invention are accomplished by the provision of a device comprising a first member, which may be fixed or movable mounted, a second member for rotational movement therewith, and spaced from the first member so as to form a narrow chamber therebetween for receipt of foam scrap. One or both of the members may be provided with means for regulating the heat generated within the chamber, so as to control the temperature of the foam scrap being processed therein. Means are provided for feeding the scrap into the narrow chamber, whereupon the rotation of one member with respect to the other causes a mulling, rolling, agitating movement of the material being heated and worked therein at substantially atmospheric pressure, so as to crush the foam cells and produce rolled strands of resin which are increasingly densified as they progress towards the periphery of the members. The product emerges from the periphery in densified curdlike form after an unusually short residence time within the processing chamber. Other ingredients, such as colorants, blowing agents etc. may be blended into the densified product by addition to the densifier along with the scrap feed. The scrap has preferably been reduced in size before feeding to the densifier, to minimize upstream space and handling problems.

Various other objects and features or advantages of the invention over those of the prior art will appear from a consideration of the following drawings and written description.

DESCRIPTION OF THE DRAWINGS

FIG. I is a partially stylized, sectional view showing the apparatus of the present invention;

FIG. II is a section taken along the line II-II of FIG. I;

FIG. III is a perspective view of some of the densified curds produced by the apparatus shown in FIG. I;

FIG. IV is a partial plan view of the rotating member shown in FIG. II wherein product guiding grooves have been formed therein;

FIG. V is a partially stylized, sectional view, similar to FIG. I of the drawings, but showing a modification to the apparatus, wherein the members have a generally conical shape;

FIGS. VI, VII and VIII are schematic, elevational views showing alternate embodiments of various feed systems which may be used with the present invention; and FIGS. IX, X, XI and XII are schematic, elevational views of further alternate embodiments of the invention, depicting vertically oriented processing chambers.

DESCRIPTION OF THE PREFERRED EMBODIMENTS

Referring to the drawings, wherein identical numerals refer to identical parts, and more particularly to FIG. I, there is shown a foam densifier 10 comprising an upper plate member 12 and a lower plate member 14. The upper member 12 is supported in static condition by means not shown, while the lower member 14 is mounted for relative rotation with plate 12. The two plates 12 and 14 are mounted in substantially superposed spaced relation to each other, and accordingly form a narrow, generally horizontally oriented processing chamber 16 therebetween. This chamber 16 is adapted to receive thermoplastic resin foam scrap to be processed by the apparatus. The distance between the two members may be equal along their radial extents, or may vary somewhat dependent on the materials being processed and the desired shape of the densified product. Also, as shown, the distance between the members may be increased in central entry port area 24, so as to accommodate a greater amount of material at the feed section because of the high bulk, low density nature of the feed material. Alternatively, this increased area may be provided in rotary member 25 as shown in FIG. XII, at 27. Cutaway portion 27 of rotary member 25 in FIG. XII may even be equipped with radially extending vanes to aid in obtaining a bite on the low density material so as to more readily permit its passage into chamber 29. These vanes on the rotary member would create a slight vacuum depending on the rotary speed so as to pull the feed inwardly, and then expel it radially outwardly into the processing chamber by means of centrifugal force. Plate 31 in FIG. XII, if desired, may also have a cutaway portion opposite portion 27 in the rotary member to further increase the size of the entry port area at this more or less stagnant center of the processing chamber.

Returning to FIG. I, upper plate 12 is provided generally centrally thereof with an opening 18, which in turn is surrounded by a vertically orientated collar or flange member 20 which may support a feed supply system. Collar 20 is further provided with means for forcing the low density foam feed scrap into chamber 16 under pressure, such as auger screw 22 which may be rotated by conventional exterior drive means not shown.

As mentioned, entrance portion 24 of chamber 16 in FIG. I is of large extent that the remaining portions of the chamber, with this achieved by means of tapered wall portion 26 of upper member 12. Furthermore, the inner surface 27 of the lower member 14 which is the surface most proximate to upper member 12, may be provided with a domed boss 28 at its center, so as to radially outwardly direct the foam scrap as it is force fed into chamber 16.

Lower member 14 is mounted on shaft 30 which in turn is journaled by means of bearing 32 within a supporting frame 34. The lower end of shaft 30 may be provided with a sheave 36 attached thereto, which is in turn connected to a conventional drive means not shown.

The drive shaft 30 of member 14 may be cored by means of channels 38 and 40, which respectively allow for the entrance and exit of a coolant. Channels 38 and 40 extend radially within the rotating member 14 either partially or entirely throughout its extent, so as to control its surface temperature. Generally the frictional heat generated by the relative rotation of members 12 and 14 working upon the feed material generates temperatures sufficiently high enough to elevate the temperature of the material to a level adequate to successfully operate the device. However, occasionally it is desirable to provide for additional heating. Such heaters 42 are shown mounted on the outer surface of upper plate 12, though it should be recognized that such heaters may be located elsewhere. Further cooling means may be provided on the upper plate 12 as well, by means, for example, of the channeled collar 44 shown at the peripheral portions thereof.

Shaft 30 may further be provided with adjusting means comprising an adjustable thrust plate 46 connected thereto, which in turn is provided with thrust bearing 50 and wear collar 52. Thus by vertical movement of adjusting screws 48 in either direction the distance between plates 12 and 14 can be varied to increase or decrease the volume of chamber 16.

Cutting means 54, typically comprising a plurality of spaced cutting elements positioned proximate to the periphery of the plates, may be provided for cutting or breaking off the densified foam scrap as it emerges from chamber 16. Cutting means 54 is preferably mounted at the periphery of the stationary plate. Beneath cutting means 54 is provided a generally circular collection hopper 56 for collecting the densified curds of material. Because of the relatively low temperature at which the process operates (to be described hereafter), the densified curds may be readily collected without sticking together.

Turning now to FIG. II of the drawings, plate 14 is therein shown as it would appear in operation, and particularly depicts formation of rolled strands 58 of partially densified foam scrap radially extending outwardly from central boss 28. Strands 58 are rolls of material being processed and are formed by the mulling or rolling action provided by the two plates 12 and 14. Strands 58 progress or move radially outward to the periphery of plate 14, whereupon they are dislodged or cut into curds 60 which are typically shown in FIG. III of the drawings.

The degree of melting or fusion in the present invention is a function of (a) the temperature of the surfaces of the plates, (b) the rotational speed of the rotating member(s), (c) the surface area of the plates, (d) the spacing of the plates from each other, (e) the surface finish of the plates, and (f) the feed rate of the material to the processing chamber. The energy imparted to the scrap being processed should not be so great as to raise the temperature to a point which results in melting the resin into a completely fused or molten mass but rather should be maintained at a level short of complete fusion such that the resin is in a highly viscous state, capable of being worked and mulled by the plates so as to crush and substantially eliminate the voids and therefore its foam cell characteristics. This highly viscous operable state has been found to be about 75° F. on either side of the glass transition temperature region of the particular resin, wherein the material has some particulate or shape retaining form, and is preferably about 20° F. on either side of the glass transition temperature region of the resin being processed. Glass transition temperature region is herein defined as the temperature range in which there occurs a change in an amorphous polymer, or in an amorphous region of a partially crystalline polymer from a hard relatively brittle condition to a viscous rubbery condition.

At least one and preferably each of the inner surfaces of the plates are roughened to increase the mulling and frictional effect upon the material being worked into strands 58. In order to better facilitate the formation of strands 58, the inner surface of plate 14 may be provided with a plurality of grooves 62 approaching the shape of an involute. Such grooves 62 are shown in FIG. IV of the drawings, and serve to assist not only in the formation of strands 58 in that the material may roll around within the grooves, but may also aid in moving the strands effectively towards the periphery of plate 14, and even increase the sojourn time of the material in the processing chamber because of their curved nature. Other grooved configurations having a similar effect may also be utilized.

In FIG. V of the drawings, there is shown a modification of the apparatus of the present invention. Therein, with the exception of the conical shape of the upper stationary plate 112 and the lower rotating plate 114, like parts have been designated with the referenced numerals used in FIG. I. The operation of the modified form of the device shown in FIG. V is the same as that for FIG. I. This embodiment may be used when unusually long dwell times of the material in the processing chamber is desired because of the increased length of the path of polymer travel. Other plates shapes may also be utilized.

In FIGS. VI and VIII of the drawings there are shown plate densifiers similar to that of FIG. I, but utilizing alternate feed mechanisms for forcing the low density foam into the processing chamber. In FIG. VI feed screw 64 extends up into the throat of feed hopper 65, is integrally attached to hub 66 of rotating plate 68, and is therefore rotated by the same drive means used to rotate plate 68. Separate exterior feed drive means is therefore not required. Screw 64 turns at the same speed as plate 68, thus drawing down material from the hopper into processing chamber 16 between the plates.

FIG. VIII depicts a reciprocating ram or pressure foot 70 in the up position, to permit the foam feed to fill in beneath it in the throat of the hopper. It is then driven to the down position by means of a piston located in housing 72, operated by pneumatic, hydraulic or mechanical induced pressure. Fluid may be introduced into and discharged from housing 72 through ports 74 and 76. Ram 70 forces feed material through the hopper throat into the processing chamber similar to the manner of functioning of screw 64 in FIG. VI. Ram 78 in FIG. IX operates similarly. Screw feeding is preferred, however, because it functions to continuously introduce material to the processing chamber. Hopper 77 in FIG. VIII may be equipped with a feed pipe 80 and cover 82.

FIG. XI depicts an alternate feed screw 84 rotated by separate external drive means, not shown, which is horizontally mounted at a right angle to the axis of the feed hopper, as opposed to the vertical mounting of FIGS. I, V and VI.

FIGS. VII, IX and X show densifying apparatus utilizing off center feed systems. FIG. VII depicts a horizontally oriented apparatus, and FIGS. IX and X depict vertically oriented apparatus with each having feed points which are radially offset with respect to the axial centerline of the plates. Use of an off center feed to the processing chamber for the horizontally oriented parallel plate densifier of FIG. VII may simplify and improve introduction of material between the plates, since surface portion 84 of rotary member 86 (FIG. VII) is moving across the opening in feed port 88 of stationary member 90. In so doing the feed material is continuously swept away from the feed port and into the processing chamber 92. Plate 90 may be cut away as at 94 on the downstream side of the feed port to permit feed entry of the scrap particles between the plates. Though a forced feed system may be used with this type of structure, it may be possible to utilize gravity feed as shown in FIG. VII, because of the cleaning action of the off center feed port by the rotating plate.

FIG. VII also illustrates a clearing paddle 96 attached to rotary plate 86 by means of arm 98 which may be used to maintain a constant level in trough 100 and move any buildup along in front of it to a central collection point not shown.

FIGS. IX—XII depict the vertical adaption of a plastic foam densifier with offset feeding, but it should be understood that central feeding may also be used in these embodiments. Vertical orientation may provide easier access for maintenance and adjustability of parts. The effect of gravity should not affect operation because of the gripping action on the foam by the plate members. Discharge is still anywhere around the periphery of the plates. Also, as shown in FIG. X, the stationary member 102 may be only a partial plate to the extent that its processing surface area is equivalent to only a portion, e.g. about one-half of that of the rotary plate, with an off center feed chute 104 feeding material between the plates slightly above the horizontal centerline of the assembly. Plate 102 may have chamfered edges 106 and 108 to aid in introducing and discharging the material.

It should be understood that the features shown in the various embodiments described above are interchangeable. Obviously orientation of the processing chamber along a plane intermediate the horizontal and vertical orientations previously described is also feasible.

Though a fixed member and a rotary member have been shown throughout the various embodiments, it is obvious that each member could be adapted to rotate at a different speed and in the opposite direction from the other, though this requires use of more complicated drive equipment over that required for the embodiments utilizing one fixed member.

In place of a rotary plate, a roller mounted continuous belt positioned adjacent the stationary member may also be used.

The following examples set forth in Table I were carried out with the apparatus shown in FIG. I of the drawings, and will serve to explain the operation of the device. Foamed polystyrene sheet was purchased from Sekisui Inc., and from W. R. Grace Co. under its trade name Cryovac Foam. To simulate scrap, the foam sheet in each instance was cut into fine flakes by means of a laboratory fly knife cutter and then screened using a 5/32-inches hole size screen. The density of the general purpose nonfoamed resinous polystyrene from which the foamed sheet was formed for both Sekisui and W. R. Grace samples is in the range of between about 1.05 to 1.08 g. per cc., whereas the density of the finely divided foam scrap generated from the foamed sheet was respectively 0.101 and 0.105 g. per cc. for the Sekisui and W. R. Grace samples.

The rotary speed and surface temperature of the movable plate is set forth for each example in Table I. The temperature of the stationary plate at the beginning of each run was at an ambient temperature of about 70° F. and rose during operation to a temperature approximating that of the rotating plate. The temperatures of the rotary plate were obtained by means of a direct contact pyrometer. The pressure within the processing chamber between the plates was atmospheric in all cases.

TABLE I

| Run number | Feed stock density (gms./cc.) | Rotary plate Speed (r.p.m.) | Rotary plate Temp. (°F.) | Plate clearance (in.) | Resultant curd Diameter (in.) | Resultant curd Length (in.) | Resultant curd Density (gms./cc.) |
|---|---|---|---|---|---|---|---|
| 1 | 0.093 | 150 | ca. 200 | ⅛ | ⅛ | ½–1 | 0.935 |
| 2 | 0.093 | 150 | 225 | 1/16 | 3/32–⅛ | ½–2 | 0.971 |
| 3 | 0.093 | 150 | 170 | 3/16 | ¼ | ½–¾ | 0.956 |
| 4 | 0.093 | 150 | 220 | 1/16 | 1/16–⅛ | ½–¾ | 0.994 |
| 5 | 1.125 | 150 | 225 | ⅛ | ⅛–¼ | ½–1½ | 0.780 |
| 6 | 1.125 | 150 | 225 | 1/32 | 1/32–1/16 | ¼–¾ | 1.012 |

The resultant densities of the curd material in each case showed that the apparatus of the present invention increased the density to a level which very closely approached that of the nonfoamed virgin material. It should be noted that the temperatures utilized herein are particularly appropriate for polystyrene foam scrap and that accordingly temperatures of varying scope would be utilized for different resinous materials such as polyethylene, polyvinyl chloride etc. As previously noted, it is particularly important that frictional heat, as well as any heat supplied by outside sources should be regulated so as to render the foam scrap material being processed short of the completely fused liquid state, since it is necessary that the material remain in a highly viscous state so that it can be significantly worked and mulled by the relative rotation of the plates. In some cases it may only be necessary to heat the plates at start up with the frictional heat generated during operation being thereafter adequate or even excessive so that cooling may be required. In general, the temperature of the plate surfaces during operation should be maintained between about 100°—350° F. and preferably between about 160°—240° F. The operating pressure in the processing chamber should be substantially atmospheric i.e. with no substantial back pressure in excess of about 25 p.s.i., so as not to contribute to the shear effect which promotes depolymerization and breakdown of the polymer being processed.

Though the foam scrap may be directly fed to the densifying apparatus in the same condition in which it is generated, it is preferable that the material be cut and reduced in size upstream of the densifier in order to reduce its bulk and facilitate handling.

Rotor speeds of between about 10 to 500 r.p.m., and plate clearances of between about one-sixteenth to five sixteenths inch and preferably between about one-sixteenth to three-sixteenths inches have been found to be particularly suitable in the present invention. The plate clearance utilized, however, is directly related to the scrap foam feed particle size.

As an important feature of the present invention additional ingredients may be blended into the scrap as it is being passed through the densifying apparatus, in order to eliminate a separate blending step and the apparatus required therefor, which would otherwise be necessary in the process between the densifier discharge and the feed to the downstream foam forming equipment. Also, materials such as solid blowing agents which decompose at elevated extrusion temperatures (for example 250°—400° F.) could be effectively added to the scrap in the densifying operation, which is carried out for a shorter period and at a lower temperature (for example 165°—240° F.) wherein such decomposition is insignificant. Liquid blowing agents might be added to the cut feed scrap just prior to its entry into the densifier. Virgin nonfoamed polymer could also be added so that the discharge from the densifier could comprise the entire direct feed to the downstream foam forming extruder.

The densified foam product resulting from the process of the present invention has a very low heat history of generally less than about 10 minutes exposure during reprocessing to temperatures greater than an ambient temperature of about 70° F., which is lower than that obtained by processing through a conventional die mounted on the discharge of an extruder. Otherwise the products in each case may be similar in appearance. Low heat history is important particularly with heat sensitive materials such as, for example, polymers of vinyl chloride, since the scrap particles will significantly change the color of the extruder sheet if they have been exposed to elevated temperatures for excessive periods. This discoloration results in production of off grade material or requires other processing means to compensate for it. The density of the recovered reprocessed product generally approaches to within about 60 to 100 percent of the density of the nonfoamed virgin material because of the substantial collapse of the foam cells during the mulling, shearing type of working in the relatively low temperature processing zone operating at essentially atmospheric pressure.

The present invention finds wide utility in the scrap reclaim field, and may broadly be utilized to transform thermoplastic film scrap of all types as well as thermoplastic foam scrap into a useful form to facilitate further processing. The apparatus is simple, the processing conditions are mild, and the product has a low heat history and a high density approaching that of the virgin material from which it was initially formed. Since operating pressures are essentially atmospheric with the open processing chamber utilized, the parts may be fabricated from relatively thin materials which in turn also facilitates temperature control from the standpoint of heat transfer rate and simplicity in construction of the heating and/or cooling means.

In describing the invention reference was made to preferred embodiments. Those familiar with the art will recognize that additions, deletions, substitutions or other modifications may be made within the purview of the invention as defined in the appended claims.

We claim:

1. Apparatus for increasing the density of thermoplastic foam scrap which comprises:
   a. a first stationary plate having a generally centrally located feed opening therein for receipt of said thermoplastic foam scrap;
   b. a second, rotatably mounted plate spaced from said first plate, said plates having generally coextensive peripheral dimensions and being positioned in generally superposed relationship to each other the space between said plates forming a narrow processing chamber having a discharge area open to the atmosphere at and extending around the periphery of said plates for emitting scrap from the apparatus after passing through said processing chamber;
   c. the inner surfaces of at least one of said plates being roughened to promote mulling contact with said foam scrap material;
   d. means for forcing the foam scrap through the opening in said first plate into contact with the inner rotatable surface of said second plate;
   e. means associated with at least one of said plates for imparting heat to the scrap within said chamber; and
   f. cutting means situated proximate the edges of the plates for cutting the densified foam scrap as it emerges from the discharge area of the processing chamber.

2. The apparatus of claim 1 wherein said cutting means comprises a plurality of knife members spaced from each other and mounted on the stationary plate such that they protrude toward the rotatably mounted plate.

3. The apparatus of claim 1 including cooling means associated with the first stationary plate for regulating the temperature of the scrap in the processing chamber.

4. The apparatus of claim 1 wherein the means for collecting the densified scrap includes a leveling member projecting radially outward of the periphery of the second plate, for directing densified scrap built up around the periphery of the processing chamber toward a central collection point.